United States Patent
Van Den Bussche et al.

(10) Patent No.: US 6,855,297 B2
(45) Date of Patent: Feb. 15, 2005

(54) NOX FILTER

(75) Inventors: Norman Van Den Bussche, Arlington Heights, IL (US); Peter M. Michalakos, Chicago, IL (US); James C. Williams, Arlington Heights, IL (US); Roman Renneke, Paducah, KY (US); Robert Tom, Redondo Beach, CA (US)

(73) Assignee: Honeywell International Inc., Morristown, NJ (US)

( * ) Notice: Subject to any disclaimer, the term of this patent is extended or adjusted under 35 U.S.C. 154(b) by 323 days.

(21) Appl. No.: 09/823,623

(22) Filed: Mar. 31, 2001

(65) Prior Publication Data

US 2001/0014302 A1 Aug. 16, 2001

Related U.S. Application Data

(63) Continuation-in-part of application No. 09/192,032, filed on Nov. 16, 1998, now abandoned.

(51) Int. Cl.$^7$ .............................................. B01D 53/34
(52) U.S. Cl. .................. 422/177; 422/171; 422/173; 422/180
(58) Field of Search ................. 422/168–171, 422/177, 180, 173; 60/297, 299, 301

(56) References Cited

U.S. PATENT DOCUMENTS

| | | | |
|---|---|---|---|
| 5,362,463 A | | 11/1994 | Stiles et al. ............... 423/239.1 |
| 5,656,244 A | * | 8/1997 | Cole ........................... 422/171 |
| 5,795,553 A | | 8/1998 | Lott et al. ................... 422/171 |
| 5,849,254 A | * | 12/1998 | Suzuki et al. ............. 423/213.5 |

FOREIGN PATENT DOCUMENTS

| | | |
|---|---|---|
| EP | 0764460 | 9/1996 |
| JP | 0625368 A | 11/1994 |
| JP | 0722763 A | 7/1996 |
| WO | WO 94/27710 | 12/1994 |

OTHER PUBLICATIONS

Patent Abstracts of Japan, Pub. No. 07000743 (Takumo Sogo Kenkyusho), Jun. 1, 1995.
Patent Abstracts of Japan, Pub. No. 04176335 A(Kawasaki Hevy Ind Ltd), Jun. 24, 1992.
Reversible Sorption of NO in Mn–Zr Oxide, Eguci et al. Journal of Catalysis Article No, 0043, vol. 158, pp. 420–26 (1996).

* cited by examiner

*Primary Examiner*—Hien Tran
(74) *Attorney, Agent, or Firm*—Oral Caglar, Esq.

(57) ABSTRACT

A filter includes a catalyst for oxidizing NOx to $NO_2$ and an alkaline for adsorbing the $NO_2$.

13 Claims, 2 Drawing Sheets

NOX FILTER

This is continuation-in-part of U.S. Ser. No. 09/193,032 filed on Nov. 16, 1998, now abandoned.

BACKGROUND OF THE INVENTION

The present invention relates to NOx removal. More specifically, the invention relates to a filter for removing nitric oxide (NO) and nitrogen dioxide ($NO_2$) from a gas such as air.

Certain environmental control systems remove nuclear, chemical and biological (NBC) agents from air. These NBC filters also remove toxic industrial chemicals (TICs) as well as toxic industrial materials (TIMs). The NBC filters may also reduce the level of NOx in the air.

The NOx reduction is performed at high air temperatures, often exceeding 200° C. See, for example, U.S. Pat. No. 5,362,463.

It would be desirable to reduce the NOx at lower temperatures, below 100° C.

SUMMARY OF THE INVENTION

According to one aspect of the present invention, a system comprises a source of gas, the gas including NOx; and a filter including a catalyst and an alkali for reducing levels of NOx in the gas. According to another aspect of the present invention, a filter comprises a catalyst for oxidizing NO to $NO_2$; a first support structure for the catalyst; an alkali for adsorbing the $NO_2$; and a second support structure for the alkali.

DETAILED DESCRIPTION OF THE INVENTION

Figure 1:
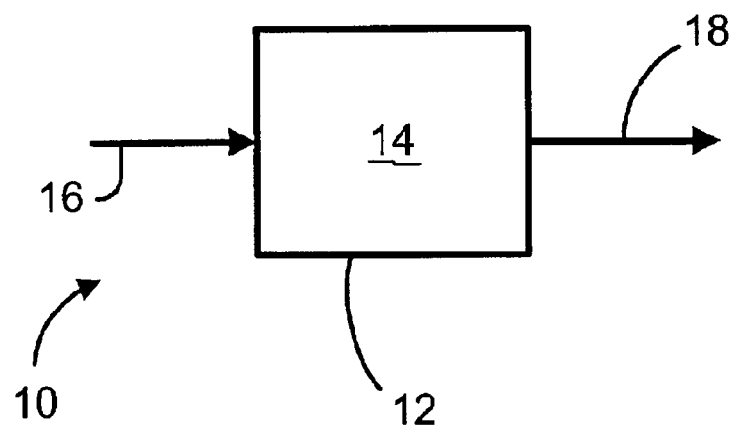
FIG. 1 is an illustration of a first filter according to the present invention.

Referring to FIG. 1, a filter 10 includes a vessel 12 containing filter material 14. During NOx removal, an incoming stream 16 of gas such as air is flowed over the filter material 14. The filter material 14 reduces the levels of nitric oxide (NO) and nitrogen dioxide ($NO_2$) in the gas. Leaving the vessel 12 is a stream 18 of gas having reduced levels of nitric oxide and nitrogen dioxide.

The filter material 14 includes a catalyst and an alkali. The catalyst oxidizes nitric oxide into nitrogen dioxide. The alkali adsorbs the nitrogen dioxide by a chemical reaction, which generates nitrate and/or nitrite on the alkali's exposed surface.

The catalyst may include manganese dioxide ($MnO_2$) and copper oxide (CuO). For example, the catalyst may be made of commercially available mixtures such as "CARULITE 200" (available from Carus Chemical Co. located in Peru, Ill.) and "HOPCALITE" (available from Nacalai Tesque located in Kyoto, Japan). The "CARULITE 200" mixture includes about sixty to seventy five weight percent manganese dioxide (60 wt % to 75 wt % $MnO_2$), about eleven to fourteen weight percent copper oxide (11 wt % to 14 wt % CuO), and about fifteen to sixteen weight percent aluminum oxide (15 wt % to 16 wt % $Al_2O_3$). The "HOPCALITE" mixture includes sixty percent manganese dioxide (60 wt % $MnO_2$) and forty percent copper oxide (40 wt % CuO).

The alkali may be potassium carbonate ($K_2CO_3$), potassium hydroxide (KOH) or another alkali or alkaline-earth carbonate or hydroxide. For example, carbonates of calcium (Ca), lithium (Li), sodium (Na), rhubidium (Rb), or cesium (Cs) may be used.

The catalyst and alkali may be combined in different ways. As a first example, the catalyst may be coated on the alkali.

As a second example of combining the catalyst and alkali, support particles are coated with the alkali, and the coated support particles are uniformly dispersed with the catalyst in the vessel 12. The support particles may be particles of alumina, silica, titania, zirconia, ceria or mixtures thereof. The support particles may be porous and may have a high internal surface area of at least 150 meters$^2$/gram (prior to coating). The geometry of the support particles may be pellets, granules, cylinders, spheres, extrudates, powders, etc. The support particles may have a size as large as five (5) millimeters. It has been found that smaller particles exhibit better gas diffusion and removal efficiency than larger particles.

As a third example material, catalyst particles (e.g., "CARULITE 200" particles or "HOPCALITE" particles) are coated or impregnated with the alkali. The catalyst particles may be impregnated with the alkali by forming an aqueous solution of the alkali material, impregnating the catalyst particles with the aqueous solution, and drying the impregnated catalyst particles. After drying, the impregnated catalyst particles may also be heat treated at a temperature above the expected operating temperature of the gas. If, however, the impregnated particles are dried at a temperature above the expected operating temperature of the air, the heat treatment step may be skipped.

Potassium carbonate ($K_2CO_3$) may be combined with "CARULITE 200" particles by impregnating 100 grams of commercially available "CARULITE 200" particles with 70 mL of an aqueous solution of $K_2CO_3$ containing 11 grams of $K_2CO_3$. The impregnated catalyst particles are then dried in a rotary impregnator at a temperature of 100° C. Both the "CARULITE 200" particles (prior to impregnation) and the dried particles (after impregnation) are sieved to 20–35 Tyler mesh.

As a fourth example of combining the catalyst and alkali, the catalyst and alkali may be layered within the vessel 12. For example, the catalyst may be placed in front (with respect to the incoming stream 16) of support particles that are coated with an alkali. Located within the same vessel 12, the catalyst and alkali are operated at the same temperature, pressure and humidity.

The filter material 14 can reduce the NOx level in gas having a temperature above or below 100° C. (as low as 35° C. and, in some instances, as low as 20° C.). The optimal formulation of the filter material 14 is temperature-dependent and specific to the catalytic material. For example, if the filter material includes "CARULITE" coated with potassium, the optimum potassium loading is lower for low temperature operation than it is for high temperature operation.

An additional material such as chromium oxide may optionally be added to the filter material 14. The chromium oxide may be added, for example, by impregnating the catalyst with water-soluble chromium salt, or mixing the water-soluble chromium salt with the water-soluble salts of the catalyst.

Figure 2:
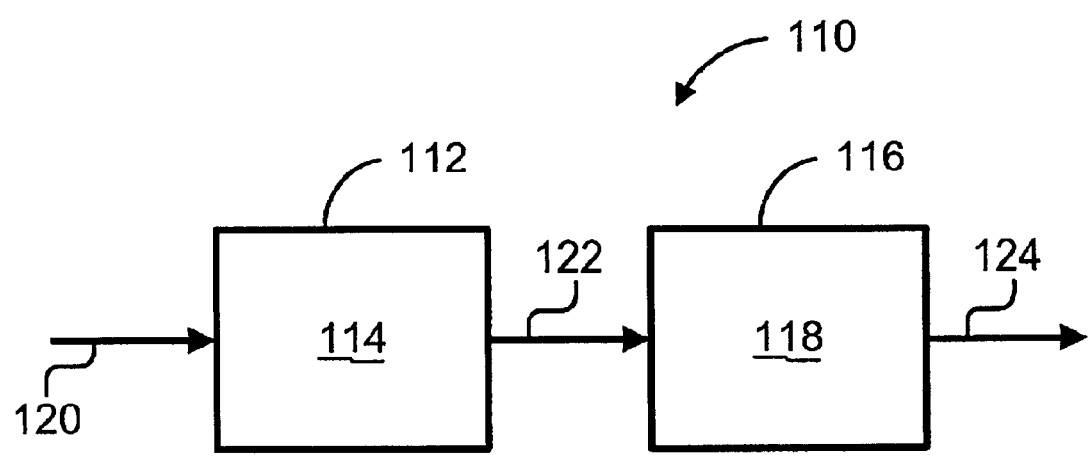
FIG. 2 is an illustration of a second filter according to the present invention.

Reference is now made to FIG. 2, which shows an alternative filter: a "split-layer" filter 110. The split-layer filter 110 shown in FIG. 2 includes first and second layers. Splitting the layers allows the alkali to be operated at a different temperature, pressure and/or humidity than the catalyst.

The first layer includes a catalyst 114 and a first support structure 112 for carrying or containing the catalyst 114. The first structure 112 may be a ceramic, monolith or other substrate upon which the catalyst 114 can be coated, or the first structure 112 may be a vessel for containing the catalyst 114.

The catalyst 114 of the split-layer filter 110 may be formed of manganese dioxide and copper oxide. However, the catalyst 114 of the split-layer filter is not so-limited. Other catalysts may be used. For example, the catalyst 114 may include manganese (Mn), or platinum (Pt), or a transition metal (e.g., chromium (Cr), vanadium (V)), or a combination of the manganese, platinum and transition metal. The manganese may be placed on a titania support, or the platinum may be placed on a titania or alumina support A noble metal other than platinum may be used as a catalyst. Iron may be used as a catalyst.

The catalyst may be in the form of a bulk oxide or impregnated metal oxide. Bulk oxides generally do not provide the catalyst dispersion that is provided by an impregnated metal oxide, A relatively small portion of the catalyst is on the surface of a bulk oxide; therefore, only a relatively small portion of the bulk oxide is exposed to a contaminant stream. In contrast, the impregnation of a metal oxide allows controlled deposition of the catalyst on the surface of the particle where it will be most effective.

The second layer includes an alkali 118 for adsorbing $NO_2$ and a second support structure 116 for the alkali 118. The second structure 116 may be a second vessel containing the alkali 118 or a ceramic, monolith or other substrate carrying the alkali 118. The alkali 118 may be the material described above in connection with FIG. 1. The alkali 118 may be impregnated in support particles of alumina, silica, titania, zirconia, ceria, calcium on alumina, potassium on titania or mixtures thereof, or it may be impregnated in catalyst particles. In the alternative, the alkali 118 may be in bulk form (e.g., bulk potassium carbonate).

The two structures 112 and 116 are spaced apart. During NOx removal, a stream 120 of gas is supplied to the first structure 112 and passed over the catalyst 114. A gas stream 122 leaving the first structure 112 is then supplied to the second structure 116 and passed over the alkali 118. A gas stream 124 leaving the second structure 116 has reduced levels of nitric oxide and nitrogen dioxide.

One advantage of splitting the layers is higher effectiveness of the catalyst. The adsorbed species (the alkaline nitrate) can build up in the second layer without blocking the catalytic activity in the first layer.

Another advantage of splitting the layers is a longer life of the catalyst. The alkali, nitrates and nitrites do not block active oxidation sites in the first layer.

Yet another advantage of splitting the layers is that the chemical and material properties of catalyst 114 and the alkali 118 may be independently optimized. The catalyst 114 may be optimized for catalytic NO to $NO_2$ activity, while the alkali 118 may have high surface area and metal dispersion for optimizing adsorption of the $NO_2$.

Still another advantage of splitting the layers is that the catalyst 114 and alkali 118 may be operated at different temperatures, pressures, and/or humidities. The oxidizing function of the catalyst may be performed at a relatively high temperature, while the adsorbing function of the alkali may be performed at a relatively low temperature. For example, the catalyst layer may be operated at temperatures between 200° C. and 450° C., while the alkali layer may be operated at temperatures between 0° C. and 350° C.

Operating the different layers at different temperatures has particular advantage in an environmental control system. An environmental control system including the split-layer filter will be described now.

Figure 3:
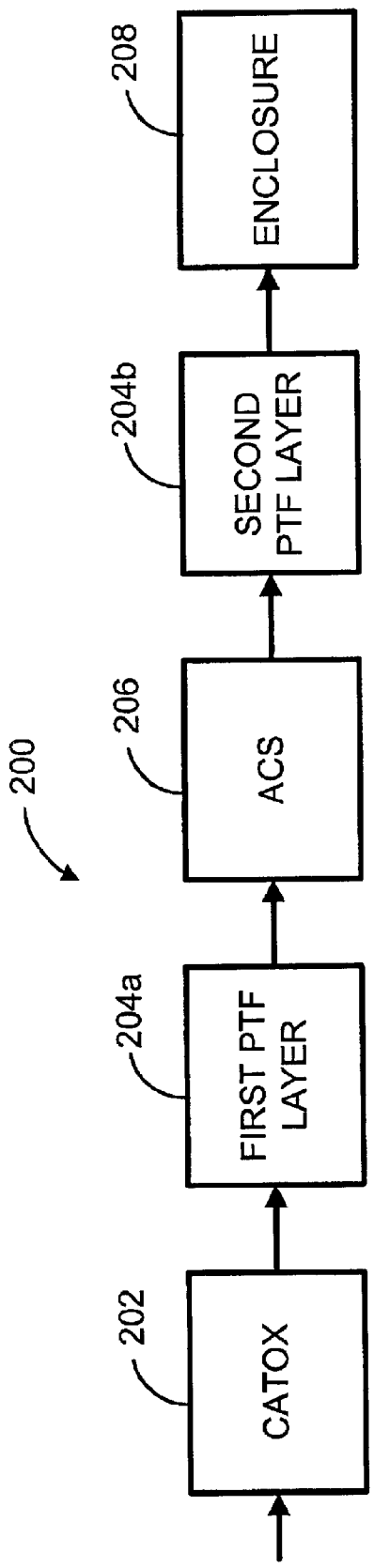
FIG. 3 is an illustration of an environmental control system including the second filter.

FIG. 3 shows an environmental control system (ECS) 200 for treating a stream of incoming air. The ECS 200 includes a catalytic oxidation reactor (CATOX) 202 for oxidizing organic agents, TICs and TIMs to carbon dioxide and water. Heteroatoms such as sulfur, nitrogen, phosphorus, chlorine, and fluorine form acid gases or precursors. Air leaving the CATOX 202 includes NOx as a TIC/TIM or acid-gas precursor.

The ECS 200 further includes a split-layer post treatment filter (PTF) including first and second layers 204a and 204b downstream the CATOX 202. The split-layer PTF 204a, 204b reduces the level of NOx in the air.

The ECS 200 further includes an air conditioning system 206 for cooling and conditioning the air. The treated air is supplied to an enclosure 208 (e.g., a crew compartment of a vehicle).

The CATOX 202 is preferably operated at residence times of 0.1 to 1.0 seconds and at temperatures in the range of 200° C.–450° C. The catalyst in the first layer 204a of the PTF is preferably operated at residence times of 0.1 to 1.0 seconds and at temperatures in the range of 200° C.–450° C. The alkali in the second layer 204b of the PTF is preferably operated at temperatures in the range of 0° C.–350° C. This lower operating temperature allows the second PTF layer 204b to be located downstream the air conditioning system 206.

The split layers 204a, 204b allow the catalyst function (the first layer 204a) to be performed adjacent the CATOX 202 at a relatively high temperature, while the alkali function (the second layer 204b) to be performed at a relatively low temperature downstream the first catalyst layer 204a.

The split layers 204a and 204b even allow the oxidizing function of the first PTF layer 204a to be integrated with the main destruction catalysts of the CATOX 202. The NOx filter catalyst may be deposited on the same monolithic structure or placed in the same container of the CATOX 202. This integration offers the added advantage of uniform temperature and pressure control of the CATOX and PTF catalysts.

Locating the second layer 204b downstream also allows for easier replacement of the alkali. The catalyst in the first PTF layer 204a has a longer life than the alkali in the second PTF layer 204b because the alkali is consumed. When the alkali is spent, it can be removed and replaced easily (especially at lower temperatures) while the catalyst in the first layer 204a remains active.

Moreover, splitting the layers 204a and 204b reduces the cost of construction material and sealing mechanisms of the ECS 200. The need for corrosion-resistant alloys and permanent seals (e.g., welds) is reduced. Eliminating the permanent seal for the alkali allows for quick change of spent alkali.

Figure 4:
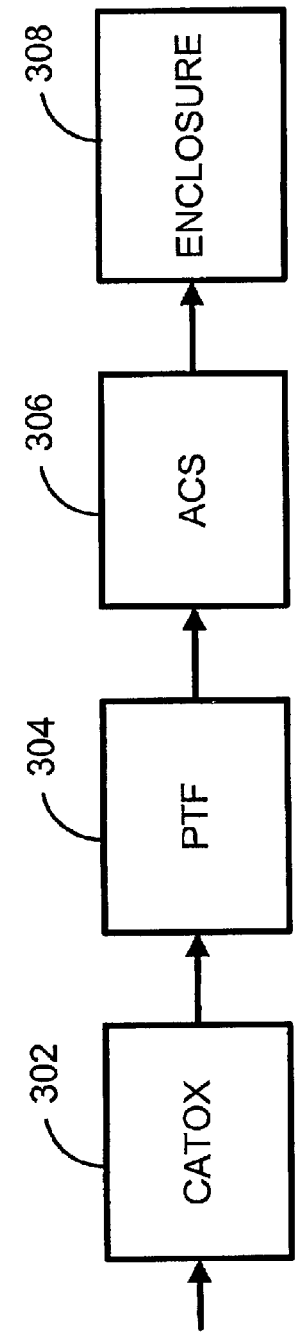
FIG. 4 is an illustration of an environmental control system including the first filter.

FIG. 4 shows an environmental control system 300 including a PTF 304 as described above in connection with FIG. 1. Both a CATOX 302 and the PTF 304 are preferably operated at residence times of 0.1 to 1.0 seconds and at temperatures in the range of 200° C.–450° C. Air leaving the PTF 304 is supplied to an air conditioning system 306 for cooling and conditioning the air. The treated air is supplied to an enclosure 308 (e.g., a crew compartment of a vehicle).

The filters according to the present invention are not limited to environmental control systems. The filters may be used, without limitation, for the removal of NOx from breathable air, the removal of NOx from combustion engine exhaust; the removal of NOx from gas streams generated by coal and residual oil burning furnaces; the removal of NOx from catalytic oxidizers and non-catalytic thermal oxidizers that process nitrogen-containing organic molecules such as amines; the removal of NOx from nitric acid production plants; and the removal of NOx from nitrite production plants. During the NOx removal, oxygen should be present.

Design considerations such as adsorbent size, gas flow rate, and desired NOx levels in the effluent gas will depend upon the application for which the NOx removal system is intended.

The present invention is not limited to the specific embodiments described above. Instead, the present invention is construed according to the claims that follow.

What is claimed is:

1. A system comprising:
   a source of gas, the gas including NOx; and
   material for filtering the gas, the filter material including a catalyst for converting NO to $NO_2$, the catalyst consisting of manganese dioxide and copper oxide, and an alkali for adsorbing the $NO_2$, wherein the alkali is coated on particles of the catalyst.

2. The system of claim 1, wherein the filter material further includes chromium oxide.

3. The system of claim 1, further comprising air conditioning apparatus downstream the filter material.

4. The system of claim 1, wherein the alkali includes potassium.

5. An NOx filter comprising:
   a catalyst for oxidizing NO to $NO_2$;
   a first support structure for the catalyst;
   an alkali for adsorbing the $NO_2$;
   a second support structure for the alkali;
   the first support structure spaced apart from the second support structure and allowing the catalyst to be operated under conditions different than the alkali; and
   wherein the catalyst and the alkali are independently optimizable.

6. The system of claim 5, further comprising a CATOX, wherein the catalyst and first support structure are integrated with the CATOX.

7. The system of claim 5, further comprising air conditioning apparatus midstream between the first and second support structures.

8. The filter of claim 5, wherein the catalyst includes manganese dioxide and copper oxide, and wherein the alkali material is potassium carbonate.

9. The filter of claim 5, wherein the catalyst includes at least one of noble metal, a transition metal, and iron.

10. A method of using the filter of claim 5, wherein the catalyst and alkali are used at different temperatures or pressures.

11. Apparatus comprising
    a CATOX; and
    a split layer PTF including a catalyst integrated with the CATOX and an alkali downstream from the catalyst, the catalyst oxidizing NO to $NO_2$, the alkali adsorbing the $NO_2$.

12. An environmental control system comprising:
    a CATOX;
    an air conditioning system (ACS) downstream from the CATOX; and
    a post treatment filter downstream from the CATOX, the filter including a catalyst and alkali.

13. The system of claim 12, wherein the catalyst is midstream between the CATOX and ACS, and the alkali is downstream the ACS.

* * * * *